Dec. 15, 1970     A. FREEMAN     3,547,714
CONVEYOR SYSTEM

Filed Jan. 3, 1968                           4 Sheets-Sheet 3

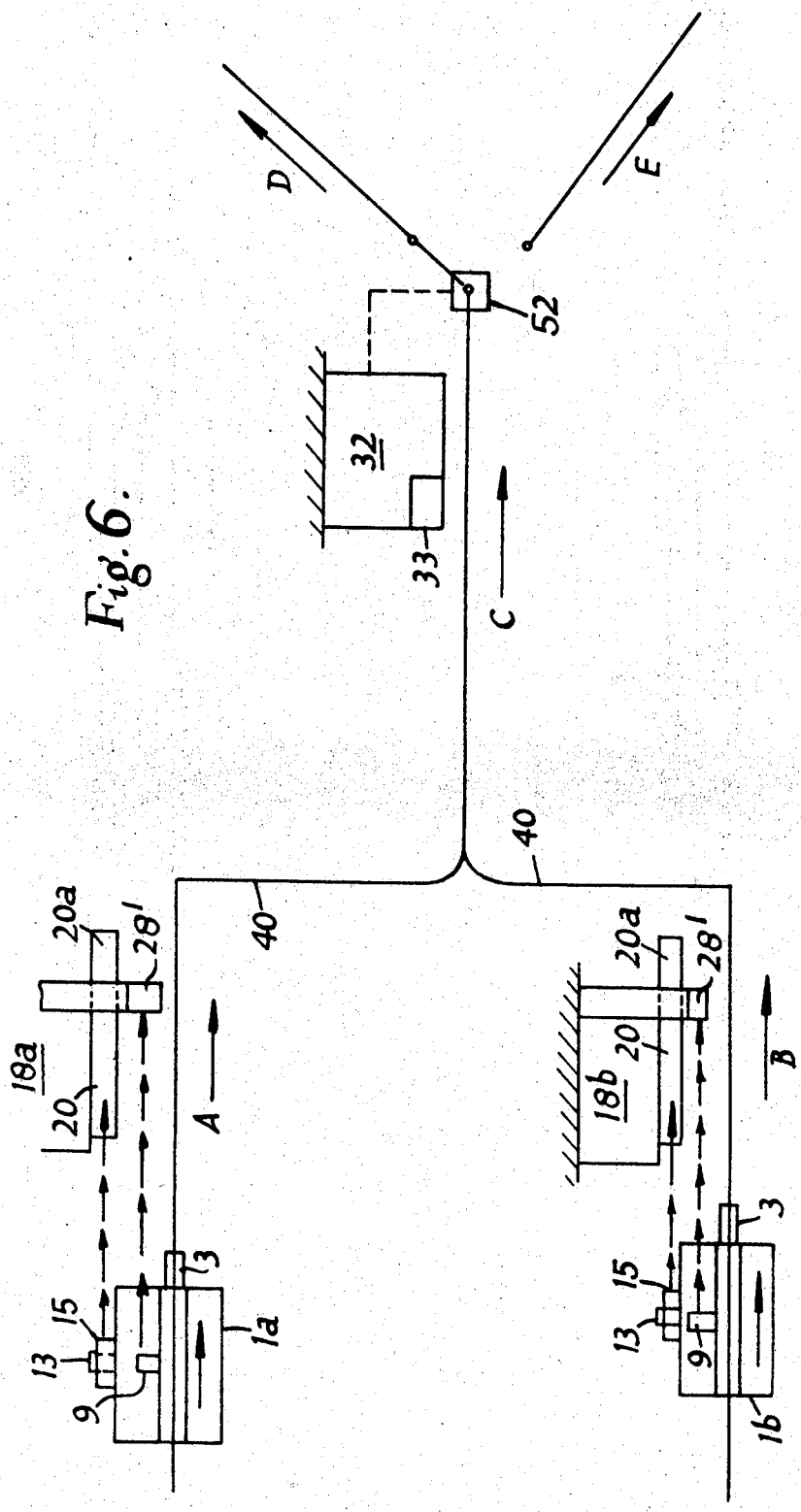

United States Patent Office 3,547,714
Patented Dec. 15, 1970

3,547,714
CONVEYOR SYSTEM
Alfred Freeman, 94 Orlingbury Road,
Isham, Northamptonshire, England
Filed Jan. 3, 1968, Ser. No. 695,438
Claims priority, application Great Britain, Jan. 4, 1967,
425/67
Int. Cl. B65g 17/00
U.S. Cl. 198—38                                    5 Claims

ABSTRACT OF THE DISCLOSURE

Conveyor system including a travelling conveyor with load-supporting carriers depending therefrom, wherein each carrier is provided with a selector device which is adjustable into different vertical positions, and can be locked in an adjusted position. Setting stations disposed adjacent the moving carriers move the selector devices thereon from a rest position, through their adjusted positions and back to rest. The station through which a carrier passes immediately after it has been loaded, locks the selector device thereon in a particular adjusted position. Reader devices in the system are each operated by an appropriately-set selector device on a carrier, and determine the destination of the load carried by the carrier.

---

Figure 1:
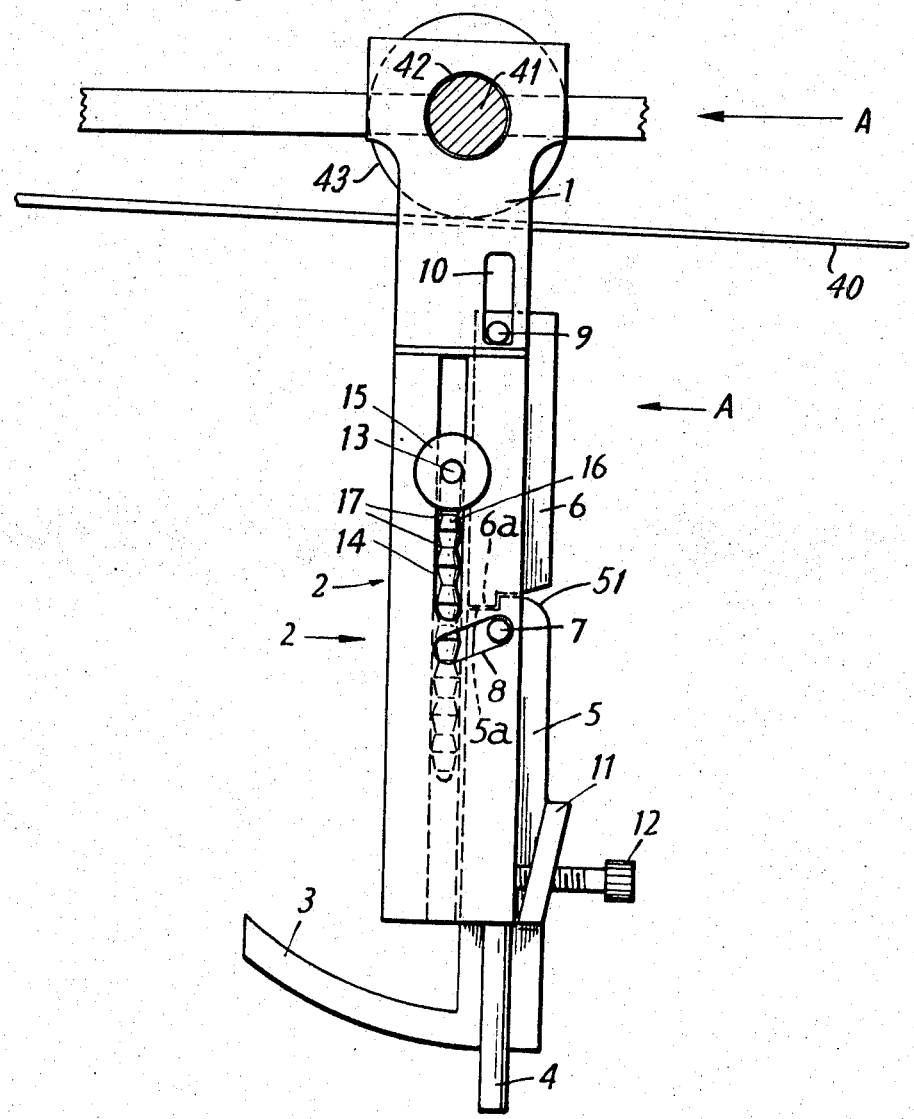

This invention is concerned with conveyor systems of the kind which include a linear travelling conveyor having a number of work or goods-supporting carriers depending therefrom, and in which means are provided for selectively determining the ultimate destination of the work or goods.

In accordance with the present invention, there is provided a conveyor system of this kind, wherein the improvement comprises at least one selector device on each of the goods-supporting carriers, said devices each being adjustable to various vertical positions; a plurality of setting stations spaced from one another in the system adjacent the path of travel of the carriers; at least one adjustable setting member at each of the setting stations, each for adjusting the position of one selector device; locking means provided on each of the carriers for securing the or each selector device in the appropriate vertical position determined by the setting member at the station through which the carrier is passing; an actuator at each setting station for operating the locking means on a carrier to which a load has been applied prior to its entering that station; and a plurality of reader devices disposed around the system, each for operation by an appropriately-set selector device on a loaded goods-supporting carrier.

Although reference will be hereinafter confined by way of convenience, to a single selector device on each carrier, it is to be understood that the invention is no way limited to this.

The idea behind the invention is that when a work or goods-supporting carrier, hereinafter referred to as a goods-supporting carrier, of the conveyor system is in an unloaded condition, it travels freely around the conveyor circuit with the conveyor, and its selector device is moved successively through some or all of its vertical positions as the carrier passes each setting station, but it not locked in any position and consequently passes the said reader devices without actuating them. If a load is applied to the carrier when it is in a position prior to entering a setting station, the selector device thereon will be moved by the said adjustable setting member of that station, and will be locked in that operative position determined by the adjusted position of said member. That carrier will then pass on through the system and will be unaffected by any other setting stations, nor will it operate any reader devices which it may meet until its selector device strikes and operates an appropriately-set reader device.

Operation of a reader device may be utilised to perform any desired function. For example, where the conveyor system is employed in a foctory, it may send a signal to the progress office of the factory, indicating that certain goods have arrived at a certain place, and/or it could be arranged to energise a solenoid which in turn operates an arm to effect removal of the work or goods from the carrier. As soon as the work or goods are removed from the carrier, the locking means are released and the selector device reverts to its original position.

Preferably, although by no means essentially, the conveyor employed in the system of this invention is in the form of a chain, for example made up of links of the form described in my co-pending United States patent application Ser. No. 695,424, filed Jan. 3, 1968.

In one preferred embodiment of the invention, the said selector device comprises a roller rotatably mounted on a spindle projecting from the carrier through a vertical slot in the side thereof, the said spindle being connected to, or integral with, a rod which is slidable in a vertical bore in the carrier and is provided with formations for engagement by a part of the said locking means, thereby enabling the roller to be locked in any one of a number of vertically spaced operative positions.

Figure 2:
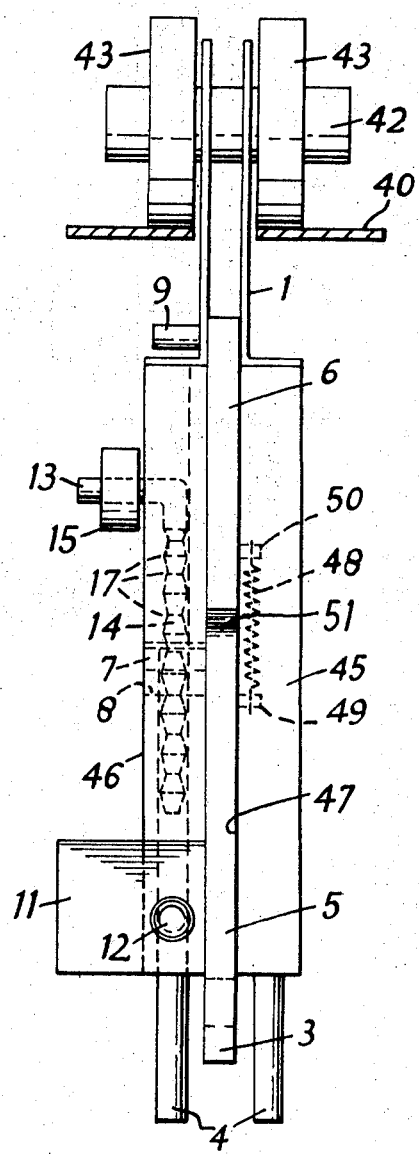
Figure 3:
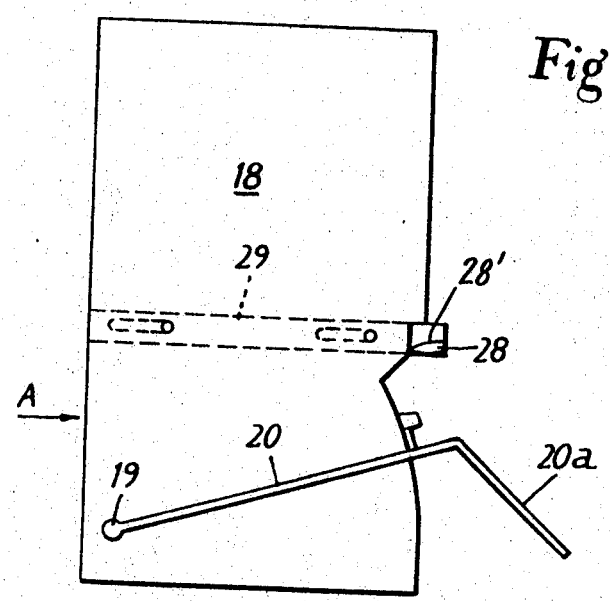
Figure 3A:
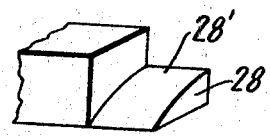
Figure 4:
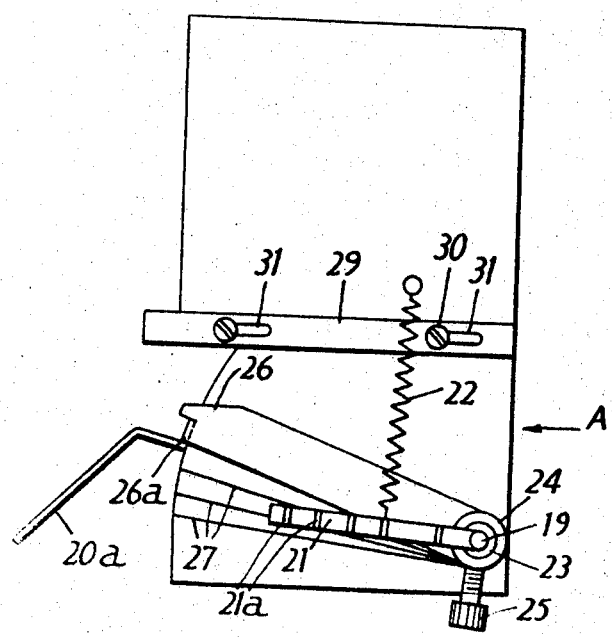
Figure 5:
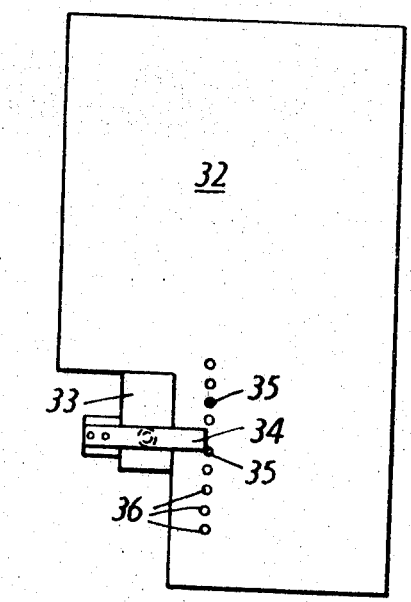

In order that the invention may be more clearly understood, and readily carried into practical effects, one specific examples thereof will now be described by way of example with reference to the accompanying drawings, wherein:

FIG. 1 is a front view of a goods-supporting carrier for use in a conveyor system constructed in accordance with this invention, and showing schematically a portion of a conveyor on which the carrier is moved, FIG. 2 is a side view of the carrier shown in FIG. 1, FIG. 3 is a front view, on a smaller scale, of a selecting station of the system, FIG. 3a is an enlarged perspective view of a portion of FIG. 2, FIG. 4 is a rear view corresponding to FIG. 3, FIG. 5 is a front view, on a similar scale as FIGS. 3 and 4, of a reader device of the system, and FIG. 6 is a schematic view of a conveyor system using the features of the present invention.

Referring to FIG. 1 of the drawings, the carrier illustrated comprises an upper portion 1, for connection to the conveyor by a spindle 41 which passes through opening 42 on portion 1, and by rollers 43 mounted on spindle 41 and engaging the surface of conveyor 40 for movement therealong. A lower portion 2 carries a hook 3 for supporting the work or goods. A pair of pins 4 are provided on either side of the hook 3 to assist in the removal of work or goods from the carrier, as will hereinafter be explained. The lower portion 2 of the carrier is made up of two similar metal side plates 45 and 46 which are welded together at the front (the left side as viewed in FIG. 1) so as to define a slot 47 at the rear side of the carrier (the right side as viewed in FIG. 1). Received in the lower part of this slot 47 is a plate 5 which carries the hook 3 at its lower end. A similar plate 6 which is vertically slidable in slot 47 and constitutes a locking plate is mounted in slot 47 above the plate 5.

The lower end of the plate 6 is provided with a protruding portion 6a which engages in a corresponding cut-out 5a in plate 5 and is held therein by a spring 48 anchored at its ends to pins 49 and 50 on plates 5 and 6, respectively, thereby connecting the two plates 5 and 6 inside the lower portion 2 of the carrier.

At its upper end adjacent the cut-out 5a, plate 5 carries a locking pin 7 which extends therefrom at right angles into an inclined slot 8 in one half of the carrier. Thus, if a load is applied to the hook 3, pin 7 is biased towards the lower end of slot 8, but is prevented from moving thereto by engagement of the complementary engaging portions 5a, 6a of the plates 5, 6. In order that these portions can be disengaged at required times, plate 6 is provided with an operating pin 9 which extends into a vertical slot 10 in the carrier and is adapted to be moved upwardly thereof as will hereinafter be described. At certain times, such as at the setting stations (to be explained in greater detail below), disengagement of portions 5a and 6a is intended to result in engagement of pin 7 in one of the grooves 17 on a rod 16 (the purpose of which will be explained below). The pin is then held in the groove 17 by the weight of the goods on hook 3 and by the fact that the portion 6a upon returning downwardly to its lower position, engages the rounded portion 51 on plate 5 rather than the portion 5a.

For subsequently moving plate 5 enough to remove the goods from the hook 3, plate 5 is further provided adjacent its lower end, with an abutment plate 11 which extends at right angles thereto and protrudes beyond the limits of the carrier at that side. A screw-threaded hole is provided in the plate for the reception of an adjusting screw 12, which abuts against the lower portion 2 of the carrier and determines the rest position of the plate 5. It will be appreciated that if an abutment is placed in the path of abutment plate 11 as the carrier travels around the system in the direction of arrow "A," hook 3 will be drawn rearwardly between the pins 4 and any work carried on the hook 3 will be pushed therefrom.

The selector device of this carrier comprises a spindle 13 which projects through a vertical slot 14 in one half of the carrier and has a roller 15 rotatably mounted thereon. The inner end of this spindle 13 is connected to the rod 16 which extends downwardly at right angles thereto within a vertical bore in the lower portion 2 of the carrier and is provided with said circumferential grooves 17 of a suitable size and shape to accommodate the pin 7. "Setting" is constituted by vertical movement of elements 13, 15, 16 and 17 (as explained below) by a certain amount, followed by engagement of pin 7 in the groove 17 opposite pin 7 after the completion of the said vertical movement.

Turning now to FIGS. 3–5 of the drawings, the setting station fixedly located at appropriate points along the conveyor is constituted by a base plate 18 having a spindle 19 turnably mounted therein adjacent its lower end, so as to extend right through the latter. Mounted on one end of the spindle 19 at the side of the base plate adjacent the conveyor, hereinafter referred to as the front of the latter located in the path of movement of roller 15, is one end of a ramp 20, whilst an arm 21 is secured to the other end of the spindle at the other side, or rear, of the base plate 18. The end of ramp 20 remote from that attached to spindle 19 has a down-turned portion 20a of spring steel.

Arm 21 is provided along its length, with a plurality of circumferential grooves 21a in which one end of a spring 22 engages, the other end of the latter being secured to the base plate at a position above the arm 21 and serving to bias the latter upwardly and thereby to also bias the ramp 20 at the other side of the plate 18.

Surrounding the end of the spindle 19 at the rear of the base plate 18 and secured to the latter, is a collar 23 which is itself enclosed within a further collar 24. The latter collar is freely turnable on the collar 23 and is adapted to be clamped thereto by means of a clamping screw 25. An adjustable positioning member 26 lies flat on the rear surface of plate 18 and is secured at one end to collar 24. The end of member 26 remote from the latter is turned over at 26a at right angles and serves as an abutment stop for limiting the upward biasing of ramp 20 by spring 22. Thus, by varying the angular situation of collar 24 with respect to collar 23, the inclination of ramp 20 may be varied. Graduated markings 27 may be provided on the rear of plate 18 to facilitate setting of the angle of inclination of the ramp 20.

Each setting station is also provided with means for raising the pin 9 to disengage the portions 5a and 6a so that the roller 15, after being raised to an operative position by movement of the ramp 20 will be held there by engagement of pin 7 in the appropriate groove 17. This means for raising the pin 9, in the illustrated embodiment, takes the form of a wedge-shaped operating element 28 which projects from the front of plate 18 into the path of the operating pin 9 of a work or goods-supporting carrier entering the station in the direction of arrow A. The element 28 is secured to one end of a mounting member 29 which is itself adjustably mounted on the rear of plate 18 through two screws 30 which engage in longitudinal slots 31 in member 29, whereby the position of the latter member can be varied longitudinally to vary the position of element 28.

It will be appreciated from the foregoing that when a carrier enters a setting station in the direction of arrow A in FIGS. 3 and 4, its roller 15 will first-of-all contact ramp 20 and ride up the same. On the roller 15 reaching the uppermost end of the ramp, the operating pin 9 of the locking means contacts the pointed end of the wedge-shaped element 28 and rides up the upper curved surface of the latter to lift the plate 6 of the locking means and to disengage the complementary engaging portions 5a, 6a thereof and, if the carrier is loaded, the locking pin 7 is caused to slide down slot 8 to engage one of the grooves 17 in rod 16 and lock the latter and thus roller 15 in the position to which it has been raised by ramp 20. As explained earlier, the plate is prevented at this time from returning to its original position.

FIG. 5 of the drawings shows a reader device located adjacent to carrier 40 downstream from the setting stations for "reading" the vertical position of the selector device (elements 13, 15, 16 and 17) on the carrier passing thereby. This device comprises a base plate 32 having a microswitch 33 mounted thereon, which may be operated by a contact element 34. The vertical position of the microswitch 33 may be varied by inserting its mounting bolts 35 in different sets of tapped holes 36 provided in the base plate 32.

FIG. 6 is a schematic view of a portion of a conveyor system utilizing the features of the present invention. In this illustration the conveyor system includes portions A through E and the arrows indicate the direction of movement of the carriers along the conveyor system. In this illustration, carriers enter the middle portion C from two incoming portions A and B. Before entering the portion C, each of the carriers 1a and 1b pass by respective setting stations 18a and 18b. At these stations the rollers 15 are lifted by ramp 20 and at an appropriate time the pin 9 is raised by cam surface 28' which results in the roller 15 being locked in its raised position. For purposes of illustration, assume that each of the devices 18a and 18b raise the element 15 of their respective carriers 1a and 1b by different amounts. In the illustration, assume that carriers from portion A are to be passed along portion D and that carriers from portion B are to be passed along portion E. Assume that switch 52 normally, that is in non-actuated position, connects portion C with the portion D. The reader device 32 may then be set to connect conveyor portions C and E only when a carrier passes thereby having a roller 15 set by the setting device 18b. Carriers 1a from conveyor portion A would have no effect on reader device 32 and hence would pass directly from portion C to portion D as the switch 52 remains in its normal or unactuated position.

The operation of a conveyor system constructed in accordance with the invention is as follows:

When no load is present on the hook 3 of a goods-supporting carrier, the latter travels around the conveyor circuit with the travelling conveyor and as it enters each setting station, the roller 15 of the selector device, rides up the ramp 20, pulling its associated rod 16 with it, and falls back to its lowest position upon leaving the station. If the carrier subsequently passes through a reader device, the latter will not be operated and the carrier will continue on around the circuit undetected.

If however, a load is applied to the hook 3 of a carrier prior to its entering a setting station, the roller 15 will ride up the ramp 20 as before but, as soon as the pin 9 is raised by the wedge-shaped element 28 as hereinbefore described, the locking pin 7 will fall into one of the grooves 17 in the rod 16 to lock the roller 15 in one of its operative positions. The carrier will then pass on through the system and at any other setting station, since the roller 15 is locked against vertical movement, it will push the ramp 20 thereof downwardly against the action of spring 22. The work or goods-supporting carrier will then pass on around the circuit until it meets a reader device having its microswitch contact member 33 in the appropriate position to be operated by the spindle 13 of the roller 15 or by the roller 15 itself in its particular operative position as determined by the inclination of the ramp at the setting station at which this position was set.

Operation of the microswitch 32 of a reader device, may, for example, as previously mentioned, be used to send a warning to a central control point indicating that certain goods have arrived at a certain destination. Alternatively, the microswitch 32 may control a solenoid which in turn functions to extend an arm into the path of the abutment plate 11 on the hook-carrying plate 6, to cause the hook 3 to be drawn rearwardly between the pins 4 and so to cause goods held on the latter, to be pushed therefrom by the pins 4.

Manifestly, if desired a further selector device could be employed on the reverse side of the carrier, this second device would require the reader devices to be arranged in pairs and the setting stations to have a ramp as ramp 20, on either side of the path of travel of the conveyor and consequently would provide a larger number of possible combinations of the positions of the selector devices to be obtained. This would enable a conveyor of increased length, to be employed.

I claim:
1. A conveyor system which includes a linear travelling conveyor having a plurality of goods-supporting carriers depending therefrom, and means for selectively determining the ultimate destination of the goods, wherein the improvement comprises at least one selector device on each of the goods-supporting carriers, said devices each being adjustable to various vertical positions; a plurality of setting stations spaced from one another in the system adjacent the path of travel of the carriers; at least one adjustable setting member at each of the setting stations, each for adjusting the position of one selector device; locking means provided on each of the carriers for securing the or each selector device in the appropriate vertical position determined by the setting member at the station through which the carrier is passing; an actuator at each setting station for operating the locking means on a carrier to which a load has been applied prior to its entering that station; and a plurality of reader devices disposed around the system, each for operation by an appropriately-set selector device on a loaded goods-supporting carrier.

2. A conveyor system according to claim 1, wherein the or each selector device comprises a roller rotatably mounted on a spindle projecting from the carrier through a vertical slot in the side thereof, said spindle being connected to, or integral with, a rod which is slidable in a vertical bore in the carrier and is provided with formations for engagement by said locking means, thereby enabling the roller to be locked in any one of a number of vertically-spaced operative positions.

3. A conveyor system according to claim 2, wherein the locking means comprise a pair of plates, both mounted for sliding movement in the carrier, and having inter-engaging portions normally biased into engagement with one another, the first of said plates carrying a goods-supporting hook and an operating pin for engagement with any one of the formations of the rod, said pin extending at right angles from the plate into an inclined slot in the carrier, the arrangement being such that when a load is present on said hook, the pin is biased towards its rod-engaging position, but is prevented from moving into this position until the second plate is moved by means of an operating pin carried thereby, to disengage said complementary engaging portions.

4. A conveyor system according to claim 3, wherein the setting stations each comprise a setting member in the form of a ramp which is spring biased upwardly against an adjustable stop, whereby the inclination of the ramp can be varied and wherein the locking means can be operated by an actuator in the form of a wedge-shaped element so disposed that the said operating pin will be lifted thereby as a carrier passes through the setting station, causing the said engaging portions to be disengaged and the selector device to be locked in its adjusted position if the carrier is loaded.

5. A conveyor system according to claim 1, wherein the reader devices are each in the form of a microswitch which is movably mounted on a base board disposed adjacent the path of the conveyor and is provided with a contact element for operation by the roller or spindle of an appropriately-set selector device to actuate the micro-switch, and an associated unloading device for removing the goods from the carrier controlled by said micro-switch.

References Cited
UNITED STATES PATENTS

| | | | |
|---|---|---|---|
| 1,778,484 | 10/1930 | Da Costa | 214—60 |
| 1,826,412 | 10/1931 | Bennett et al. | 214—60 |
| 1,986,420 | 1/1935 | Webb et al. | 198—38 |

HUGO O. SCHULZ, Primary Examiner

U.S. Cl. X.R.

198—177; 214—60